United States Patent
Montiel

(10) Patent No.: US 7,608,319 B2
(45) Date of Patent: Oct. 27, 2009

(54) NONSLIP FLOOR FOR HEAVY TRAFFIC AND THE PROCESS FOR THE OBTAINING THEREOF

(75) Inventor: Gabriel Lopez Montiel, Naucalpan (MX)

(73) Assignee: Pyn, S.A de C.V., Naucalpan (MX)

( * ) Notice: Subject to any disclaimer, the term of this patent is extended or adjusted under 35 U.S.C. 154(b) by 134 days.

(21) Appl. No.: 11/903,040

(22) Filed: Sep. 20, 2007

(65) Prior Publication Data
US 2009/0029110 A1  Jan. 29, 2009

(30) Foreign Application Priority Data
Jul. 24, 2007  (MX) ................ MX/A/2007/008910

(51) Int. Cl.
| | |
|---|---|
| *B32B 3/12* | (2006.01) |
| *B32B 5/18* | (2006.01) |
| *B32B 5/24* | (2006.01) |
| *B32B 27/04* | (2006.01) |
| *B32B 27/12* | (2006.01) |
| *B32B 17/02* | (2006.01) |
| *D04H 1/00* | (2006.01) |

(52) U.S. Cl. .................. 428/158; 428/156; 428/159; 428/187; 442/1; 442/2; 442/9; 442/27; 442/30; 442/38; 442/46; 442/55; 442/56; 442/58; 442/101

(58) Field of Classification Search ................ 428/158, 428/159, 187, 156, 167; 442/1, 2, 9, 16, 442/19, 27, 30, 38, 46, 55, 56, 58, 101
See application file for complete search history.

(56) References Cited

U.S. PATENT DOCUMENTS

| | | | |
|---|---|---|---|
| 3,804,700 A | 4/1974 | Hoey | |
| 4,018,957 A | 4/1977 | Werner et al. | |
| 4,039,709 A | 8/1977 | Newman | |
| 4,088,805 A | 5/1978 | Wiegand | |

(Continued)

FOREIGN PATENT DOCUMENTS

GB          2025319          6/1978

(Continued)

*Primary Examiner*—David R Sample
*Assistant Examiner*—Catherine Simone
(74) *Attorney, Agent, or Firm*—Bracewell & Giuliani LLP

(57) ABSTRACT

This invention refers to synthetic decorative coverings in order to cover and protect trafficable surfaces. More specifically, it refers to a novel structure and composition of a nonslip floor for heavy traffic and the process for the obtaining thereof; characterized in that it consists of a multilayer structure, consisting of a first upper layer, highly resistant to wear and tear, consisting of a solid, color calendared film with an upper surface and a lower surface, where the upper surface has engravings or embossed patterns; a second layer of high resilience, consisting of a colored, foamed calendared film with an upper surface and a lower surface, with the upper surface being thermoadhered to the lower surface of said first layer; a third layer of high adhesion to the surfaces whereupon it is placed, consisting of a mesh covered with foam, consisting of an upper surface and a lower surface, with the upper surface being joined to the lower surface of said second layer of high resilience by means of an adhesive. Said third layer of high adhesion defines an upper surface including open spaces that grip to the surface where it is placed.

5 Claims, 3 Drawing Sheets

U.S. PATENT DOCUMENTS

| | | |
|---|---|---|
| 4,284,681 A | 8/1981 | Tidmarsh et al. |
| 4,305,985 A | 12/1981 | Heublein |
| 4,403,009 A * | 9/1983 | Onderak et al. ............ 428/159 |
| 5,346,278 A | 9/1994 | Dehondt |
| 5,707,903 A | 1/1998 | Schottenfeld |
| 5,874,371 A | 2/1999 | Owen |
| 6,022,617 A | 2/2000 | Calkins |
| 6,150,444 A | 11/2000 | Brodeur, Jr. |
| 6,221,796 B1 * | 4/2001 | Hawley et al. ................ 442/43 |
| 6,911,406 B2 | 6/2005 | Sobonya |
| 2002/0162307 A1 | 11/2002 | Arnold |
| 2005/0090167 A1 | 4/2005 | Hynicka et al. |
| 2006/0252320 A1 | 11/2006 | Panse |

FOREIGN PATENT DOCUMENTS

MX            202993            6/2001

* cited by examiner

NONSLIP FLOOR FOR HEAVY TRAFFIC AND THE PROCESS FOR THE OBTAINING THEREOF

BACKGROUND OF THE INVENTION

1. Field of the Invention

This invention relates to synthetic decorative coverings in order to cover and protect trafficable surfaces. More specifically, it relates to a novel structure and composition of a nonslip floor for heavy traffic and the process for the obtaining thereof.

2. Description of the Related Art

Before this invention, floors have been developed with distinct structures and configurations, such as heavy traffic floors. Heavy traffic floors are generally floors of laminated plastic materials which have a non-woven material attached to the underside thereof; said floors are permanently fixed with adhesive on the surfaces to be covered, given that said floors generally tend to slip or move in the area where they are placed.

U.S. Pat. No. 6,022,617 of Mark A. Calkins, granted on Feb. 8, 2000, protects a laminated nonslip mat consisting of a first laminated layer of a non-woven material with a first and a second surface; the second surface has a printed pattern of a relatively high friction material such as a group of closed points; a second laminated layer of printed vinyl with a first and a second surface; and an adhesive between the first and the second layer.

However, said mat has a simple structure made up of only two layers with an intermediary joining adhesive and it is not apt for a heavy traffic floor, apart from the fact that said high friction material consists of a high density matrix of printed latex or PVC projections, the above results in inadequate adherence to the floor where it is placed, and it does not allow a pleasant movement and rest of the pedestrians.

U.S. Publication No. 2006/0252320 of Dattatreya Ramesh Panse; said application shows a laminated woven material consisting of a first layer of polyurethane woven fabric that is laminated to an extruded PVC compound. The composition of the film is mainly PVC, and thermoplastic polymer of polyurethane and a micronized mixture of polytetrafluoroethylene. The composition and structure of said lamination is very different from the composition of the nonslip floor for heavy traffic of our invention and it does not offer the advantages of our invention.

U.S. Publication No. 2005/0090167 A1 of Steven F. Hynicka, presented on Nov. 15, 2004. Said patent application intends to protect a laminated floor structure of material, consisting of a woven material encapsulated within a resistant floor structure, including a calendared base of PVC, a first film of hot fusion, a second film of hot fusion, a calendared wear and tear film and a high resilience layer. Said resistant floor structure with encapsulated material, which consists of only providing dimensional stability, is complex as is the manufacturing thereof, and it is completely different from our invention concerning the composition and structure, and offers no advantages over our invention.

Accordingly, it can be seen that up to now there exists no floor structure and composition of heavy traffic for the covering and protection of trafficable surfaces that avoid the need to be joined by adhesives on the surface to be covered in order to be able to remove it when thus required, or that offers rest to the pedestrians and that allows the absorption of noises and knocks.

Due to the above, the development of the nonslip floor for heavy traffic corresponding to this description follows a need to perfect the structure and composition of floors for heavy traffic in order to provide better benefits to the Users and pedestrians, and in order to improve the physical properties and provide advantages for the installation and use thereof.

SUMMARY OF THE INVENTION

Generally, the nonslip floor for heavy traffic, in accordance with this invention, is made up of a multilayer structure, consisting of an upper layer, highly resistant to wear and tear, consisting of a solid, color calendared film with an upper surface and a lower surface, where the upper surface has engravings or embossed patterns; a second layer of high resilience, consisting of a colored, foamed calendared film with an upper surface and a lower surface, with the upper surface being thermoadhered to the lower surface of said first layer; a third layer of high adhesion to the surfaces whereupon it is placed, consisting of a mesh covered with foam, consisting of an upper surface and a lower surface, with the upper surface being joined to the lower surface of said second layer of high resilience by means of an adhesive. Said third layer of high adhesion defines an upper surface including open spaces distributed in a determined pattern or at random, which may consist of distinct shapes such as rectangles, triangles, diamond shapes, polygons or combinations thereof. Open spaces provide grip to the surface where it is placed.

The main objective of this invention is to make available a nonslip floor for heavy traffic, which is unique in that it may be installed on trafficable surfaces in order to cover and protect them, without them being needed to be fixed to the surface with an adhesive, and furthermore, it does not slip due to the action of distinct forces applied thereto during transit thereupon.

Another objective is to permit said nonslip for to be used with heavy traffic, which also has the advantage of being able to be repositioned in different areas.

Another objective of the invention is to make said floor available for heavy traffic, which is also easy to install and able to be cut to the size required in function of the surface to be covered.

Another objective of the invention is to make said floor available for heavy traffic, which is also easy to clean and able to be removed for cleaning and put back into place after cleaning.

Another objective of the invention is to make said floor available for heavy traffic, which also provides protection against corrosive agents of the surfaces whereupon it is placed, as well as hiding damage such as cracks.

Another objective of the invention is to make said floor available for heavy traffic, which also has antistatic, insulating, and cushioning properties.

Another objective of the invention is to make said floor available for heavy traffic, which also has antiskid properties on the upper surface.

Yet another objective of the invention is to make said floor available for heavy traffic, which also has excellent properties for the absorption of noises and knocks.

Yet another objective of the invention is to provide a process for the obtaining of a nonslip floor for heavy traffic that is simple and quick.

All such qualities and objectives shall be made apparent upon performing a general and detailed description of this invention supported by the illustrated modalities.

BRIEF DESCRIPTION OF THE DRAWINGS

In order to better understand the characteristics of the invention, the drawings described hereunder, which are illustrative but not limitative, are enclosed with this description.

DETAILED DESCRIPTION OF THE PREFERRED EMBODIMENTS

Figure 1:
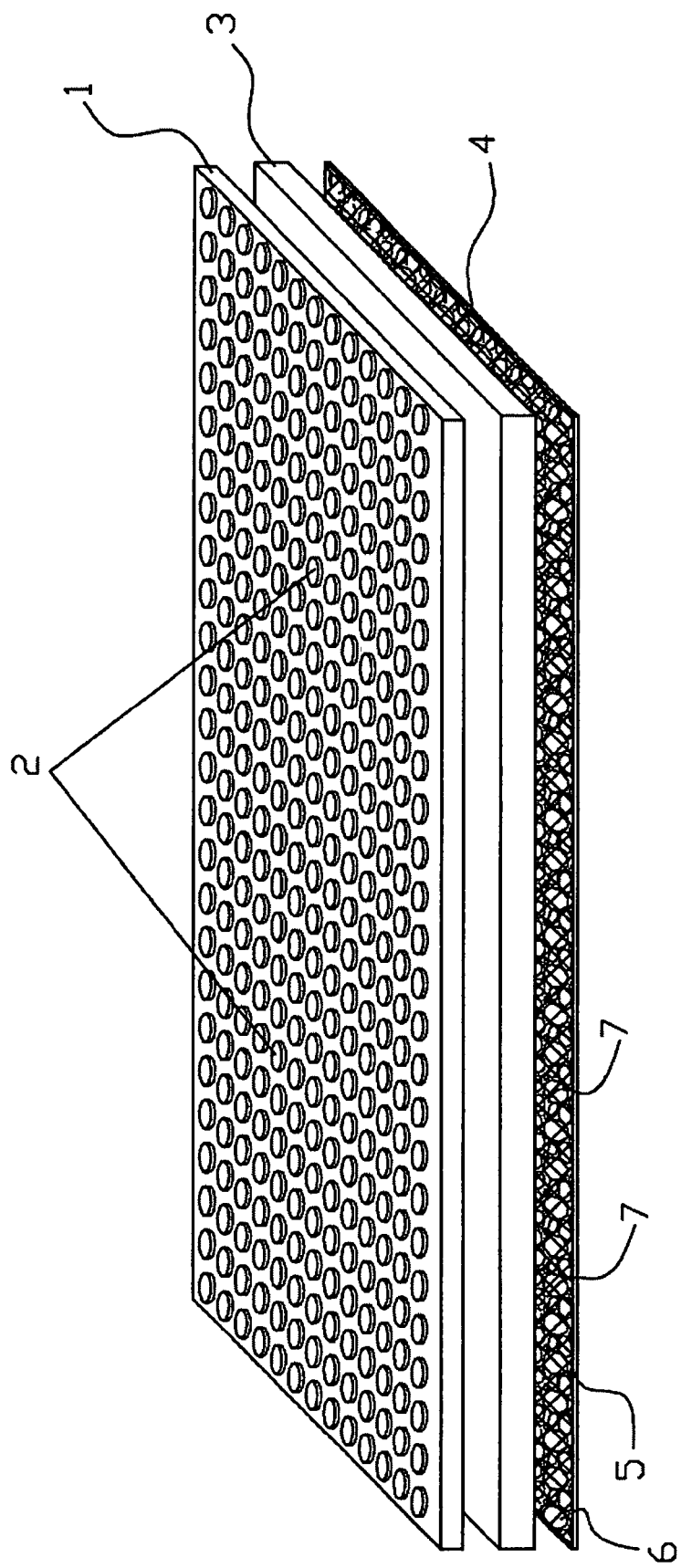
FIG. 1 shows a conventional perspective view of a section of the nonslip floor for heavy traffic, in accordance with this invention.

In order to better understand the invention, a detailed description shall be made hereunder of some of the modalities thereof as shown in the drawings, which for illustrative but not limitative purposes are attached to this description.

The characteristic details of the nonslip floor for heavy traffic and the process for the obtaining thereof, are clearly shown in the following description and the illustrative drawings attached hereto, with the reference numbers serving to specify the same parts.

Generally, a nonslip floor for heavy traffic, in accordance with the present invention, is comprised of a multilayer structure. The structure includes of an upper layer, highly resistant to wear and tear, having a solid, color calendared film with an upper surface and a lower surface, where the upper surface has engravings or embossed patterns; a second layer of high resilience, formed of a colored, foamed calendared film with an upper surface and a lower surface, with the upper surface being thermoadhered to the lower surface of said first layer; a third layer of high adhesion to the surfaces whereupon it is placed, composed of a mesh covered with foam, having an upper surface and a lower surface, with the upper surface being joined to the lower surface of said second layer of high resilience by means of an adhesive. The third layer of high adhesion defines an upper surface including open spaces distributed in a determined pattern or at random, which may take the form of distinct shapes such as rectangles, triangles, diamond shapes, polygons or combinations thereof. Open spaces provide grip to the surface where it is placed.

The multilayer structural configuration of said nonslip floor provides excellent adherence on the surface covered thereby, avoiding slippage during the passage of pedestrians, and the upper surface of high resistance to wear and tear, offers excellent properties against abrasion.

The three layers have the following composition:
a) Suspension resin of vinyl polychloride and/or copolymer of vinyl chloride;
b) Plasticizers in order to provide flexibility that are added at an amount of between 10 and 100 parts per one hundred parts of resin;
c) Other components such as elastomers, Barium/Zinc or tin stabilizers, lubricants, biocides, flame retardants, pigments, charges and any other additive in order to facilitate processing; and
d) Foaming agents such as azodicarbonamide and derivatives thereof, expandable hydrazines and/or microspheres of acrylic polymers, nitrile-acryl, styrene, PVDC, and with butane or pentane gas or another liquid. The amount may vary from between 1 and 10 parts per one hundred parts or resin.

Plasticizers are selected from the group consisting of phthalates (DOP, DINP, DOTP, DIDP, BBP, DEHP) and/or phosphates (TBP, TCP, DPCP) and/or benzoates (PGDB, DPGDB, DE/DPGDB) and/or some other mixture of plasticizers Apart from the components listed above, the third layer contains polyester or nylon mesh or a mesh of some other material, and vinyl polychloride emulsion resins and/or vinyl chloride copolymers.

The process for the preparation of the nonslip floor for heavy traffic as previously described consists of three principal phases. Phase 1, in the first phase, the first and second layers are made according to the following steps: a) add and homogenize in an intensive high speed mixer, the aforementioned composition until a dry mixture is obtained; b) mix said mixture in mixers in order to plasticize it, and c) form the calendared films in a 4 and/or 5-roller calendar.

The temperature, speed and pressure conditions are appropriately controlled in this phase 1 in order to produce the foamed film with a thickness of 0.005" to 0.100".

Phase 2, in the second phase, the third layer is formed according to the following steps: d) mix the aforementioned components in order to prepare a plastisol; e) cover a mesh or textile with the plastisol; f) cure in an oven and expand the plastisol.

Phase 3, in the third phase, the following steps are performed; g) the three layers are laminated in a laminator under specific temperature and pressure conditions, placing the upper layer of high resistance to wear and tear in the upper part, in the middle part the second high resilience layer is placed, and in the lower part the third high adhesion layer is placed; h) add an adhesive between said second middle layer of high resilience and said third lower layer of high adhesion.

The phases may be undertaken simultaneously or at different times, being able to make the three layers, and in the same production line subsequently laminate the three layers, applying the adhesive between the second and third layers in order to join them, joining the first and second layers by thermoadhesion.

FIG. 1 shows a conventional perspective of a section of the nonslip floor for heavy traffic according to this invention. In said figure, the nonslip floor for heavy traffic, in accordance with this invention, is made up of a multilayer structure, consisting of an upper layer, highly resistant to wear and tear 1, consisting of a solid, color calendared film with an upper surface and a lower surface, where the upper surface has engravings or embossed patterns 2; a second layer of high resilience 3, consisting of a colored, foamed calendared film with an upper surface and a lower surface, with the upper surface being thermoadhered to the lower surface of said first layer 1; a third layer of high adhesion 4 to the surfaces whereupon it is placed, consisting of a mesh 5 covered with foam 6, consisting of an upper surface and a lower surface, with the upper surface being joined to the lower surface of said second layer of high resilience 3 by means of an adhesive (not shown). Said third layer of high adhesion defines an upper surface including open spaces 7 distributed in a determined pattern or at random, which may consist of distinct shapes such as rectangles, triangles, diamond shapes, polygons or combinations thereof. Said open spaces 7 provide grip to the surface where it is placed.

Figure 2:
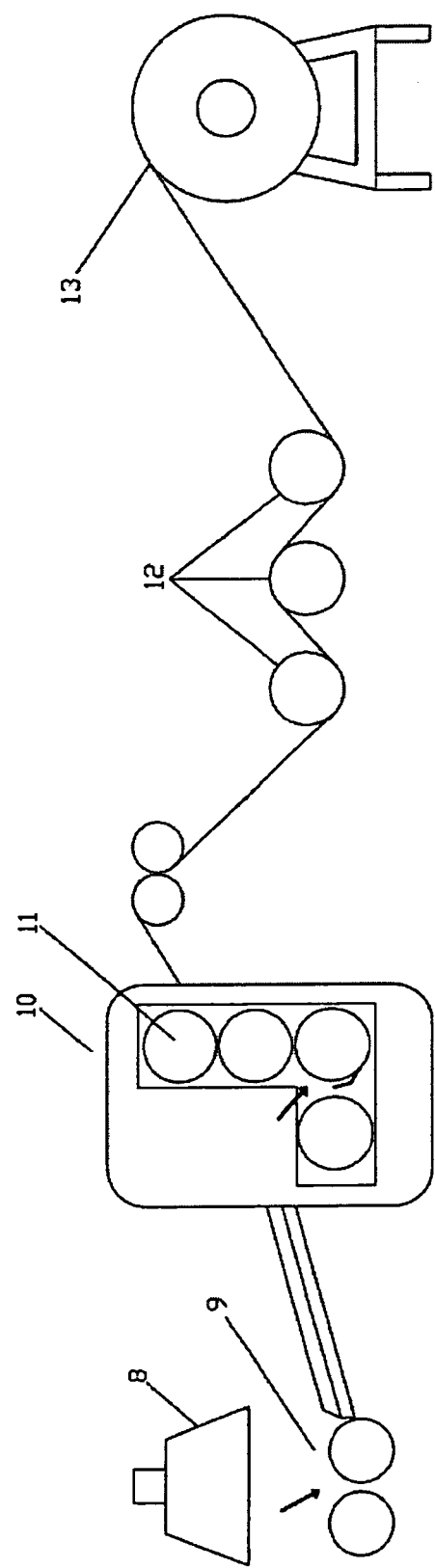
FIG. 2 shows a schematic diagram of the calendaring process for obtaining the first and second layers of the nonslip floor for heavy traffic.

FIG. 2 shows a schematic diagram of the calendaring process for obtaining the first and second layers of the nonslip floor for heavy traffic. Said figure shows that by means of a dosage hopper, the homogenized, mixed and plasticized mixture of the composition described in the brief description is dosed, which, be means of a pair of rollers is fed towards the calendar 10, which in this case is of four rollers 11, in order to form the solid films that are to make up the first upper layer highly resistant to wear and tear, and the foamed layer that shall make up the second layer of high resilience; said films are fed by a set of rollers 12 towards a roller 13, where it shall be rolled. The first and second layers are made separately, and instead of being rolled in the roller, they may pass directly for laminating together with the third layer, joining the first and second layer thermically.

Figure 3:
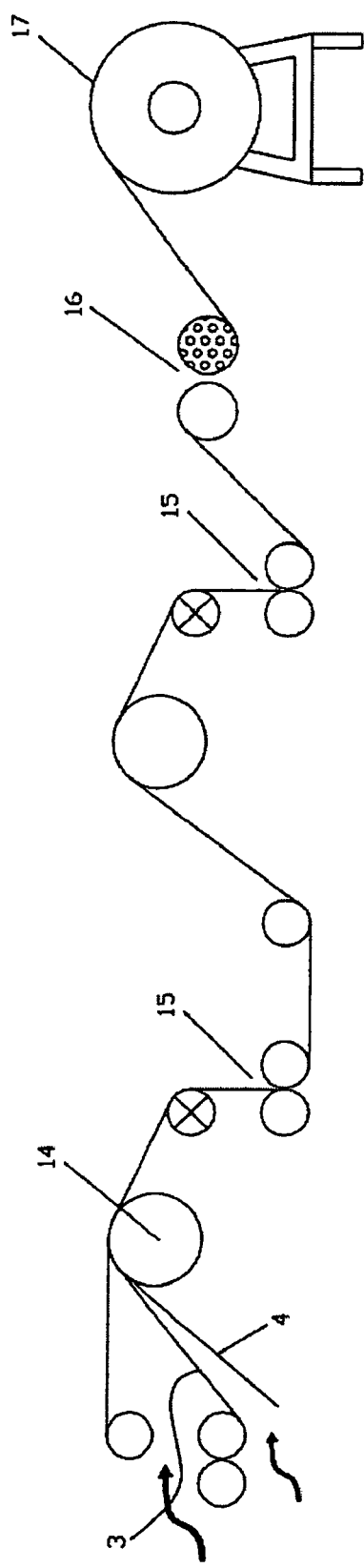
FIG. 3 shows a schematic diagram of the lamination process of the three layers for the formation of the nonslip floor for heavy traffic.

FIG. 3 shows a schematic diagram of the laminating process of the three layers for the formation of the nonslip floor for heavy traffic. Said figure shows the feeding of the first upper layer of high resistance to wear and tear 1, the second layer of high resilience 3 is fed under the first layer 1 and the third layer of high adhesion 4 is dosed under the second layer 3, previously adding an adhesive between said second 3 and third layers 4 or at the moment of dosage thereof towards a first roller 14 joining the three layers and a first and second of compression rollers 15 and a par of etching rollers 16, in order to finally feed them towards a roller 17 where it is rolled.

The invention has been sufficiently described in order for a person with average knowledge in the field to be able to reproduce and obtain the results we mention in this invention. However, any person with skills in the technical area who deals with this invention may be able to make modifications not described in this application; however, if, for the application of such modifications in a determined structure or in the manufacturing process thereof, the material is required of the following claims, said structures should be included within the scope of the invention.

What is claimed is:

1. Nonslip floor for heavy traffic, characterized in that it consists of a multilayer structure, consisting of a first upper layer, highly resistant to wear and tear, consisting of a solid, color calendared film with an upper surface and a lower surface, where the upper surface has engravings or embossed patterns; a second layer of high resilience, consisting of a colored, foamed calendared film with an upper surface and a lower surface, with the upper surface being thermoadhered to the lower surface of said first layer; a third layer of high adhesion to the surfaces whereupon it is placed, consisting of a mesh covered with foam, consisting of an upper surface and a lower surface, with the upper surface being joined to the lower surface of said second layer of high resilience by means of an adhesive, said third layer of high adhesion defining an upper surface including open spaces that grip to the surface where it is placed.

2. Nonslip floor for heavy traffic according to claim 1, characterized in that said open spaces of said third layer of high adhesion are distributed with a determined pattern or at random, and are of distinct forms such as rectangles, triangles, diamond shapes, polygons or combinations thereof.

3. A composition for forming a nonslip floor for heavy traffic, structure with three layers, consisting of an upper layer highly resistant to wear and tear, a second layer of high resilience and a third layer of high adhesion, in accordance with claim 1, characterized in that said composition for the three layers consists of a) a suspension resin of vinyl polychloride and/or copolymer of vinyl chloride; b) plasticizers in order to provide flexibility that are added at an amount of 10 to 100 parts per one hundred parts of resin; c) other components such as elastomers, Barium/Zinc or tin stabilizers, lubricants, biocides, flame retardants, pigments, charges and any other additive in order to facilitate processing; d) foaming agents such as azodicarbonamide and derivatives thereof, expandable hydrazines and/or microspheres of acrylic polymers, nitrile-acryl, styrene, PVDC, and with butane or pentane gas or another liquid, at an amount varying from between 1 and 10 parts per one hundred parts or resin.

4. The composition for the formation of a nonslip floor for heavy traffic in accordance with claim 3, characterized in that said plasticizers are selected from the group consisting of phthalates (DOP, DINP, DOTP, DIDP, BBP, DEHP) and/or phosphates (TBP, TCP, DPCP) and/or benzoates (PGDB, DPGDB, DE/DPGDB), and/or some other mixture of plasticizers.

5. The composition for the formation of a nonslip floor for heavy traffic in accordance with claim 3, characterized in that the third layer of high adhesion also contains a polyester or nylon mesh or a mesh of some other material, and vinyl polychloride emulsion resins and/or vinyl chloride copolymers.

* * * * *